(12) United States Patent
Sakamoto

(10) Patent No.: US 7,377,607 B2
(45) Date of Patent: May 27, 2008

(54) LIQUID EJECTING APPARATUS AND METHOD OF TRANSFERRING IMAGE DATA

(75) Inventor: Takayuki Sakamoto, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 414 days.

(21) Appl. No.: 11/110,948

(22) Filed: Apr. 21, 2005

(65) Prior Publication Data

US 2005/0248599 A1 Nov. 10, 2005

(30) Foreign Application Priority Data

Apr. 21, 2004 (JP) ............................ P2004-125870

(51) Int. Cl.
*B41J 29/38* (2006.01)
(52) U.S. Cl. .......................................................... 347/9
(58) Field of Classification Search ...................... 347/9
See application file for complete search history.

(56) References Cited

U.S. PATENT DOCUMENTS

| | | | | |
|---|---|---|---|---|
| 5,816,714 | A | * 10/1998 | Hori | ............................ 400/61 |
| 2003/0193536 | A1 | * 10/2003 | Kuronuma et al. | ............ 347/9 |
| 2003/0193674 | A1 | * 10/2003 | Kanda et al. | ................ 358/1.4 |

* cited by examiner

*Primary Examiner*—Julian D. Huffman
(74) *Attorney, Agent, or Firm*—Sughrue Mion, PLLC

(57) ABSTRACT

A liquid ejecting apparatus includes an image buffer which stores image data, a memory, a liquid ejecting head which ejects a liquid droplet therefrom based on the image data, and a head control unit which transfers the image data stored in the image buffer to the memory, and transfers the image data for each color stored in the memory to the liquid ejecting head. The head control unit transfers first null data to the liquid ejecting head before start of the transfer of the image data from the memory to the liquid ejecting head. The head control unit transfers the null data to the liquid ejecting head after end of transfer of the image data from the memory to the liquid ejecting head.

7 Claims, 7 Drawing Sheets

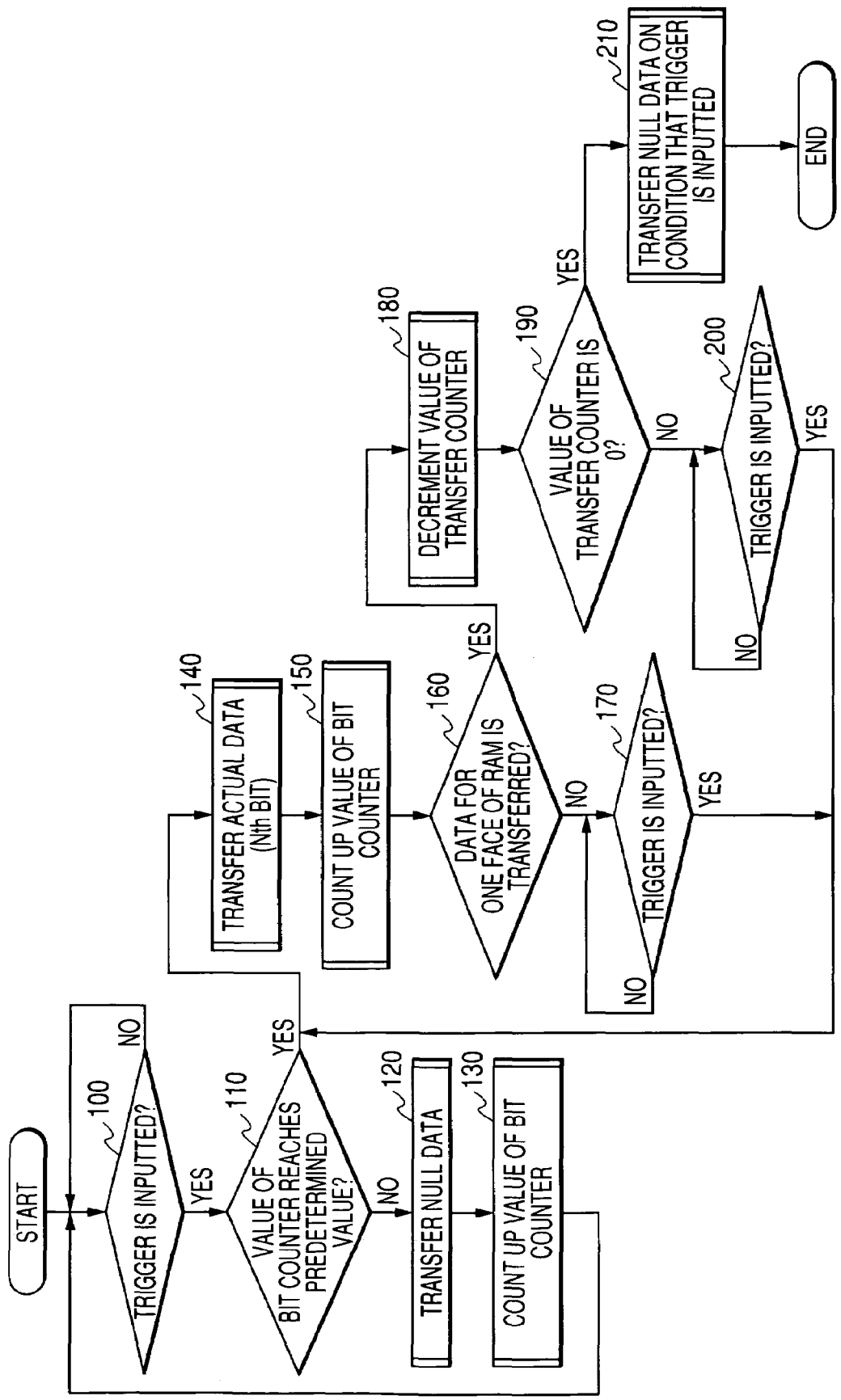

LIQUID EJECTING APPARATUS AND METHOD OF TRANSFERRING IMAGE DATA

BACKGROUND OF THE INVENTION

The present invention relates to a liquid ejecting apparatus and a method of transferring image data, and in particular to a liquid ejecting apparatus that sequentially transfers image data, which are stored in an image buffer, to a liquid ejecting head to perform liquid ejecting processing and a method of transferring image data.

Recently, for example, a printer of an ink jet system has been known as one of printing apparatuses. In recent years, even if such a printer is not connected to a host computer such as a personal computer, the printer alone can perform print processing as a so-called standalone machine. In the printer of this type, a series of image processing such as color conversion processing and binarization processing is realized by, for example, a control ASIC that is connected to a CPU via a bus. A memory (e.g., SDRAM), from which the ASIC can read data and in which the ASIC can write data directly, is connected to this control ASIC. An image buffer or the like for storing respective image data (specifically, dot data indicating presence or absence of a dot format) supplied to a print head is established using this memory.

In such a printer, the image data stored in the image buffer are read in a memory (e.g., SDRAM, hereinafter referred to as "CPU memory"), from which the CPU can read data and in which the CPU can write data directly, once under control of the CPU and, then, sequentially transferred to the print head. On the basis of the respective color image data received in this way, the print head discharges ink droplets of the respective colors from nozzles corresponding to the colors to thereby form an image.

However, in the related constitution described above, there are following problems.

First, since the transfer of the image data to the print head is performed on the basis of the control of the CPU, there is a problem in that a processing load on the CPU increases. The printers in recent years are desired to have more functions and more complicated functions. Therefore, it is desirable to reduce processing executed by the CPU as much as possible.

Second, when the transfer of the image data is performed on the basis of the control of the CPU in this way, there is a problem in that head gaps of the print head are limited to a fixed value. Specifically, the head gaps are formed among nozzle rows corresponding to the respective colors in the print head. Therefore, in order to form (hit) ink dots discharged from the respective color nozzles in a position of an identical pixel on a print medium, it is necessary to give null data (data having "0" in all bits) to the image data of the respective colors and transfer the image data in an attempt to fill such head gaps. In other words, it is necessary to shift timing for transferring the image data of the respective colors for each color in association with the head gaps (this is called null gap).

When such data transfer is performed on the basis of the control of the CPU, the CPU has to manage the transfer of the image data for the respective colors collectively. Thus, in order to transfer the image data without decreasing processing efficiency of the CPU as much as possible, the head gaps are limited to a fixed value that depends on a size of the image data sequentially read in the CPU memory.

In order to solve this problem, it is conceivable to adopt a method of giving null data of a predetermined transfer amount, which corresponds to the head gaps, to the image data in advance and storing the null data in the image buffer. However, this method is not suitable because a size of the image buffer is increases.

SUMMARY OF THE INVENTION

The invention has been devised in view of the above circumstances and it is an object of the invention to provide a liquid ejecting apparatus that is capable of performing liquid ejecting processing, for example printing process, in association with a liquid ejecting head with arbitrary head gaps while reducing a processing load on a CPU.

In order to achieve the above object, according to the present invention, there is provided a method of transferring image data, comprising:

transferring image data stored in an image buffer to a memory;

transferring the image data for each color stored in the memory to a liquid ejecting head for ejecting a liquid droplet from the liquid ejecting head;

transferring first null data to the liquid ejecting head before start of the transfer of the image data from the memory to the liquid ejecting head; and transferring second null data to the liquid ejecting head after end of transfer of the image data from the memory to the liquid ejecting head.

According to the present invention, there is also provided a liquid ejecting apparatus includes an image buffer which stores image data, a memory, a liquid ejecting head which ejects a liquid droplet therefrom based on the image data, and a head control unit which transfers the image data stored in the image buffer to the memory, and transfers the image data for each color stored in the memory to the liquid ejecting head. The head control unit transfers first null data to the liquid ejecting head before start of the transfer of the image data from the memory to the liquid ejecting head. The head control unit transfers the null data to the liquid ejecting head after end of transfer of the image data from the memory to the liquid ejecting head.

According to the constitution, in respectively scanning the liquid ejecting head, the first null data is transmitted until a first counter becomes a counter value of designating to start to transmit the image data. Further, after starting to transmit the imager data in accordance with the first counter, the image data is transmitted until a second counter becomes the counter value of designating to finish to transmit the image data. Further, after the second counter becomes a counter value of designating to finish to transmit the image data, the second null data is transmitted. In this case, according to the constitution, the first counter and the second counter designate to start to transmit and finish to transmit the image data of respective colors independently from each other for respective colors. Thereby, the head control unit can respectively generate automatically the first and second null data provided to the image data to transmit for respective colors. In this way, according to the constitution, the null data provided to the image data of respective colors can automatically be generated at inside of the head control unit to transmit to the liquid ejecting head. Therefore, a printing processing in correspondence with a printing head having an arbitrary head gap can be executed by alleviating a processing load of CPU.

Preferably, the first null data is transferred to the liquid ejecting head on the basis of head gaps defined among respective color nozzle rows of the liquid ejecting head.

The liquid ejecting head is formed with the head gap and the null data is needed for matching positions of forming (impacting) ink dots injected from the respective color nozzles by filling the head gap. In other words, a timing of starting to transmit each color image data depends on the head gap. Therefore, when a section of the null gap of each color in correspondence with the head gap is counted by the null gap counter, the null data can be transmitted before starting to transmit image data of each color.

The above-described liquid ejecting apparatus constitutes a gist thereof by that a null gap counter is set with a counter value constituted by subtracting an amount of a count number in correspondence with the null gap from a predetermined counter value for designating to start to transmit the image data as the initial value at each scanning of the liquid ejecting head.

According to the constitution, the head control unit starts to transmit image data on a condition that the null gap counter is a predetermined counter value. Further, the predetermined counter value of designating to start to transmit the image data may be any value, may be, for example, an upper limit value or a lower limit value of the counter or may be other arbitrary value. That is, the predetermined counter value is a counter value constituting a reference of determination when the head control unit starts to transmit each color image data. Therefore, for example, when a counter value constituted by subtracting the amount of the count number in correspondence with the null gap from the counter value constituting the reference is previously set to the null gap counter at each scanning of the liquid ejecting head, image data can be started to transmit on a condition that the null gap counter of each color becomes the predetermined counter value.

Preferably, the liquid ejecting head reciprocatingly moves at a forward ejecting operation and a rearward ejecting operation in a scanning direction while ejecting the liquid droplet therefrom. The first null data is transferred to the liquid ejecting head on the basis of the head gaps corresponding to moving directions of the liquid ejecting head at the forward ejecting operation and the rearward ejecting operation.

In this way, when the liquid ejecting head executes the bidirectional operation, the null gap differs respectively in moving forward and in moving rearward the liquid ejecting head. According to the constitution, the pertinent null gaps are set in accordance with the directions of scanning the liquid ejecting head and therefore, transmission of the null data can preferably be executed in either of moving forward and moving rearward the liquid ejecting head.

Preferably, the method further comprising:

counting the number of transfer bits of the image data transferred from the memory to the liquid ejecting head for one face of the memory; and transferring the second null data to the liquid ejecting head based on both of a count value indicating null gaps of respective colors corresponding to the head gaps in each scanning operation of the liquid ejecting head and a result of the counting process.

According to the constitution, the head control unit successively counts up a transmission bit designating counter at each time of reading the image data from the included memory to transmit to the liquid ejecting head. Therefore, the head control unit can grasp a transmission bit position of the image data successively transmitted to the liquid ejecting head when the count value of the transmission bit designating counter is referred.

Preferably, the method further comprising:

counting the number of the image data transferred from the memory to the liquid ejecting head by one face of the memory; and transferring the second null data to the liquid ejecting head based on both of the number of the transferred image data for one scanning operation of the liquid ejecting head previously set in each scanning operation of the liquid ejecting head and a result of the counting process.

According to the constitution, the head control unit can grasp finishing of transmission of the image data by the amount of one scanning based on the counter value of the second counter and can transmit the null data after finishing the transmission.

Preferably, the memory includes a first memory and a second memory for each color. The image data is transferred from the image buffer to the first memory and the second memory alternately. The image data read from the first and the second memories alternately are transferred to the liquid ejecting head.

In this way, data transmission can efficiently be carried out when the memory is provided with the first memory and the second memory for respective colors and writing/reading of the image data is alternately executed to and from the two memories.

Preferably, the image data to be transmitted to the liquid ejecting head is read from the memory sequentially by an amount corresponding to a nozzle number of the liquid ejecting head when the image data for each color is transferred to a liquid ejecting head.

According to the constitution, the head control unit can transmit the image data of the amount of one scanning of the liquid ejecting head without interposing control of CPU. Further, the head control unit can automatically generate the null data at inside thereof to transmit to the liquid ejecting head without interposing control of CPU in transmitting the image data. Therefore, the printing processing can preferably be carried out in correspondence with the liquid ejecting head having the arbitrary head gap while reducing the processing load of the CPU.

BRIEF DESCRIPTION OF THE DRAWINGS

The above objects and advantages of the present invention will become more apparent by describing in detail preferred exemplary embodiments thereof with reference to the accompanying drawings, wherein:

FIG. 9 is a flowchart showing processing for data transfer to the print head.

DETAILED DESCRIPTION OF THE PREFERRED EMBODIMENTS

Figure 1:
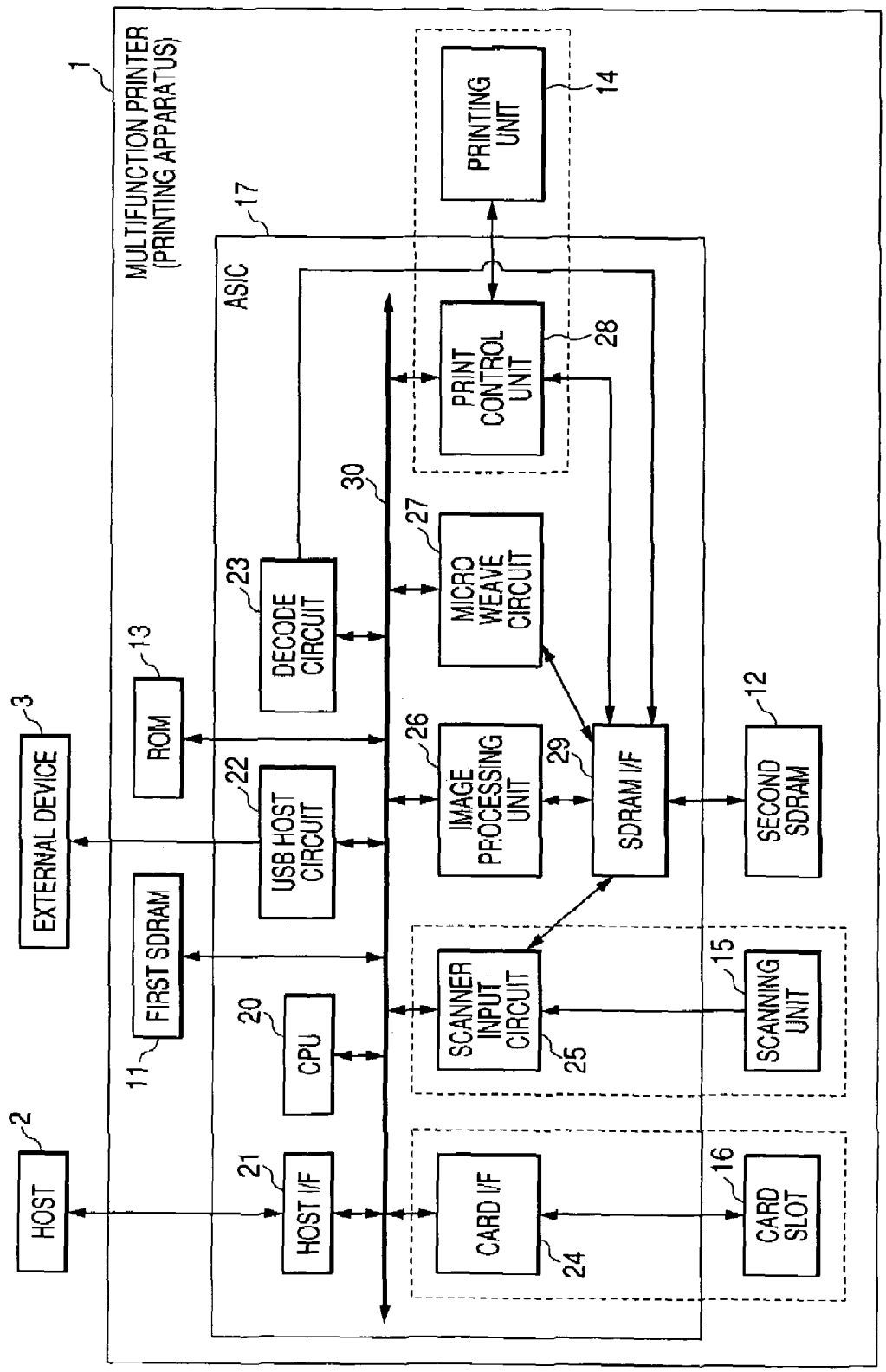
FIG. 1 is a block diagram of a multifunction printer (a printing apparatus) in an embodiment of the invention.

An embodiment of the invention embodied in a multifunction printer (a printing apparatus) will be hereinafter explained in accordance with FIGS. 1 to 9.

First, a schematic structure of the multifunction printer will be explained with reference to FIG. 1.

A multifunction printer (hereinafter referred to as "printer") 1 is an ink jet printer including a scanner function, a printer function, and a copy function and is a standalone machine that can execute print processing alone even if the printer is not connected to a host computer (hereinafter referred to as "host") 2 such as a personal computer. It is needless to mention that the printer 1 can be connected to the host 2 and execute various kinds of processing such as print processing and scanner reading processing as a peripheral apparatus of the host 2.

A portable recording medium such as a memory card is inserted in the printer 1. The printer 1 can read image data from such a recording medium and execute print processing. Moreover, it is possible to connect the printer 1 to an external device 3 such as a digital camera, a cellular phone, or a hard disk so as to be capable of communicating with each other via a predetermined interface, for example, a USB (Universal Serial Bus) or Bluetooth (registered trademark). Note that, when the printer 1 is connected to the external device 3 via the USB, the printer 1 itself serves as a USB host and a connection partner device serves as a USB device.

The printer 1 includes a first SDRAM (Synchronous DRAM) 11, a second SDRAM 12, a ROM 13, a printing unit 14, a scanning unit 15, a card slot 16, and an ASIC (Application Specific IC) 17.

Various programs, data, and the like for controlling the printer 1 are stored in the ROM 13. For example, an image file of a JPEG format read from a memory card or the external device 3 is stored in the first SDRAM 11. Various areas are secured in the second SDRAM 12. For example, an area for storing RGB line data read by scan, an area for storing CMYK dot data (color planes) generated by applying the color conversion processing and the binarization processing to the line data, an area (an image buffer) for storing image data by rearranging raster lines of the respective color planes in association with the number of nozzles and nozzle arrangement of the print head according to micro weave processing, and the like are secured in the second SDRAM 12.

The printing unit 14 includes a carriage, a print head attached to the carriage, a carriage motor, and a sheet feeding motor. The print head has a large number of nozzles for the respective colors on a surface of a print medium such as a sheet corresponding to a conveying path. The print head forms an image on the print medium by discharging ink droplets of the respective colors from nozzles corresponding to the respective colors while reciprocatingly moving in a main scanning direction (a direction perpendicular to a sheet feeding direction) on the basis of drive of the carriage motor.

The scanning unit 15 includes an exposure lamp, a CCD (Charge Coupled Device) sensor, a pulse motor, and an A/D conversion circuit. This scanning unit 15 optically reads an original placed on an original stand (not shown), subjects charges accumulated in the CCD to A/D conversion, and generates a read image as multi-gradation image data of an RGB color system.

The card slot 16 is provided as an inserting section for inserting a memory card or the like serving as a portable recording medium. The printer 1 can read image data stored in the memory card or the like inserted in this card slot 16 to execute print processing.

The ASIC 17 includes a CPU 20 serving as a print control unit, a host interface circuit (hereinafter referred to as "host I/F") 21, a USB host circuit 22, a decode circuit 23, a card interface circuit (hereinafter referred to as "card I/F") 24, a scanner input circuit 25, an image processing unit 26, a micro weave circuit 27, a print control unit 28, and an SDRAM interface circuit (hereinafter referred to as "SDRAM I/F") 29. Among these circuits and units, the CPU 20, the host I/F 21, the USB host circuit 22, the decode circuit 23, the card I/F 24, the scanner input circuit 25, the image processing unit 26, the micro weave circuit 27, and the print control unit 28 are connected to an internal bus 30 of the ASICS 17. Note that the first SDRAM 11 and the ROM 13 are also connected to the internal bus 30.

The CPU 20 reads out a program stored in the ROM 13 and executes processing according to this program to control an operation of the printer 1 collectively. For example, the CPU 20 causes the image processing unit 26 to execute the color conversion processing and the binarization processing or causes the print control unit 28 to execute transfer processing or the like for image data from the second SDRAM 12 described later.

The host I/F 21 performs control for two-way communication with the host 2, which is connected to the host I/F 21 by a predetermined interface cable, such as reception of print control data from the host 2 and transmission of status information to the host 2. The USB host circuit 22 stores an image file or the like of the JPEG format, which is read from the external device 3 (a USB storage device) through a USB cable, in the first SDRAM 11 via the internal bus 30. In addition, the card I/F 24 stores an image file or the like of the JPEG format, which is read from the memory card through the card slot 16, in the first SDRAM 11 via the internal bus 30. Note that a reading section includes the card I/F 24 and the card slot 16.

The decode circuit 23 decodes an image file of the JPEG format read out from the first SDRAM 11 and stores multi-gradation image data of the RBG color system (hereinafter referred to as "RGB data"), which is obtained by decoding the image file, in the second SDRAM 12 via the SDRAM I/F 29.

The scanner input circuit 25 stores RGB multi-gradation data read by the scanning unit 15 in the second SDRAM 12 via the SDRAM I/F 29. Note that a scanner unit includes the scanner input circuit 25 and the scanning unit 15.

The SDRAM I/F 29 controls writing of data in the second SDRAM 12 and readout of data from the second SDRAM 12. Note that, in this embodiment, the SDRAM I/F 29 transfers data between the ASIC 17 and the second SDRAM 12 according to burst transfer. Here, the burst transfer is a transfer system in which, when one address is set, data of subsequent addresses are transferred continuously.

The image processing unit 26 acquires RGB multi-gradation data from the second SDRAM 12 through the SDRAM I/F 29 or acquires RGB multi-gradation data from the scanner input circuit 25 (the scanner unit) directly and applies the color conversion processing to the RGB multi-gradation data to generate multi-gradation image data of a CMYK color system (hereinafter referred to as "CMYK data"). In addition, the image processing unit 26 applies the binarization processing to the multi-gradation data (the CMYK data) after the color conversion, converts the CMYK data represented by a gradation value of pixels into CMYK dot data (color planes) of a representation format according to presence or absence of a dot format, and stores the CMYK dot data in the second SDRAM 12 through the SDRAM I/F 29.

Note that, in this embodiment, the CMYK data are, for example, eight colors of C (cyan), M (magenta), Y (yellow), K (black), LC (light cyan), LM (light magenta), DY (dark yellow), and CR (clear). The respective colors are developed to dots to generate dot data of two bits per one dot. The dot data of two bits is data indicating presence or absence of a dot format and a size of a dot in forming the dot. In this embodiment, the dot data is data indicating that a large dot is formed (e.g., "11"), a medium dot is formed (e.g., "10"), a small dot is formed (e.g., "01"), or no dot is formed (e.g., "00").

The micro weave circuit 27 acquires CMYK dot data from the second SDRAM 12 trough the SDRAM I/F 29 and applies the micro weave processing to the CMYK dot data to generate image data obtained by rearranging raster lines of the respective color planes in association with the number of nozzles and nozzle arrangement of the print head. This image data is stored in the second SDRAM 12 (the image buffer) through the SDRAM I/F 29.

Here, the micro weave processing will be explained. Since the respective nozzles of the print head are arranged at a nozzle pitch of a resolution lower than a print resolution in a sheet feeding direction (a sub-scanning direction), it is impossible to form rasters of continuous numbers in one main scan. Thus, in each main scan, raster forming positions are shifted little by little every time a raster is formed while forming plural rasters at a nozzle pitch interval and spaces among rasters are filled with rasters little by little to form continuous rasters finally. This is called the micro weave processing.

The print control unit 28 includes a head control unit (hereinafter referred to as "HCU") 31 (FIG. 2) serving as a head control unit, a signal generating unit (not shown) that generates a drive signal (specifically, a trapezoidal wave) for driving an actuator (a piezo-oscillator) of the print head, and a drive circuit (not shown) that controls to drive a sheet feeding motor and a carriage motor.

The print control unit 28 sequentially reads image data in a built-in memory of the HCU 31 described later from the second SDRAM 12 through the SDRAM I/F 29 and supplies this image data to the print head as print data. Note that the drive signal generated by the signal generating unit is also supplied to the print head. The print control unit 28 controls to drive the sheet feeding motor and the carriage motor to reciprocatingly move the print head in the main scanning direction and discharges ink dots of the respective colors from the nozzles corresponding to the colors while controlling presence or absence of discharge of ink dots and an amount of ink dots (a size of dots) to be discharged. Note that a print execution unit includes the print control unit 28 and the printing unit 14.

Next, a specific structure of the HCU 31 according to this embodiment will be described in detail.

The HCU 31 in this embodiment is capable of transferring the image data of the respective colors stored in the second SDRAM 12 (the image buffer) to the built-in memory of the HCU 31 without the intervention of a CPU bus (the internal bus 30 of the ASIC 17 shown in FIG. 1). Moreover, in transferring image data necessary for print processing for one scan of the print head, the HCU 31 can perform data transfer without the intervention of control of the CPU 20 in the transfer process. It is needless to mention that the HCU 31 is also capable of executing such data transfer under control of the CPU 20. In addition, the HCU 31 in this embodiment also has a function of automatically generating null data according to head gaps among the respective color nozzle rows formed in the print head in the HCU 31, giving the generated null data to the image data, and transferring the null data to the print head.

Figure 3:
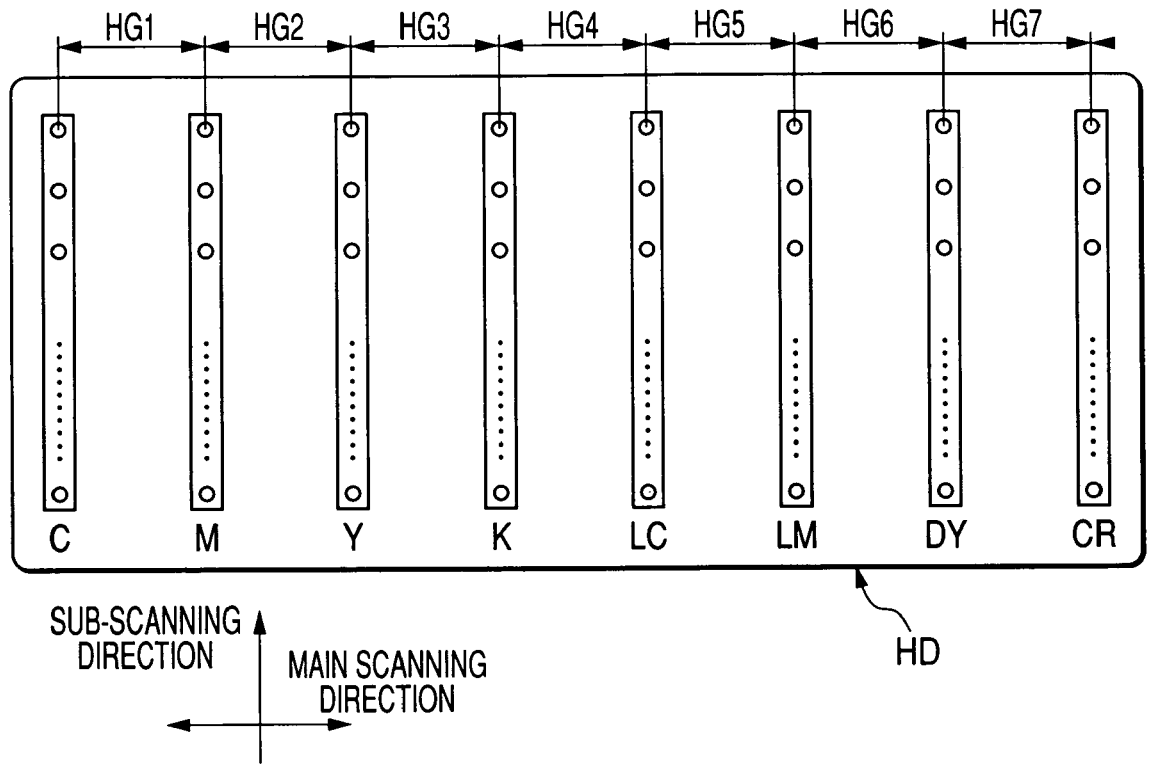
FIG. 3 is a conceptual diagram showing a print head.

Here, the head gaps will be explained. As shown in FIG. 3, for example, in the print head in this embodiment, nozzle rows for eight columns corresponding to the respective colors of C, M, Y, K, LC, LM, DY, and CR and head gaps HG1 to HG7 are formed among the respective color nozzle rows. Note that, in the respective color nozzle rows, for example, 184 nozzles are formed per one nozzle row in this embodiment. Since such head gaps HG1 to HG7 are formed in the print head HD, in order to form (hit) ink dots of the respective colors in a position of an identical pixel on a print medium, it is necessary to shift hitting timing of the ink dots discharged from the nozzles of the respective colors in association with the head gaps HG1 to HG7 according to movement of the print head HD.

The null data is data in which all bits are set to "0" (in this embodiment, two bit data of "00" corresponding to one dot). Specifically, this null data is data for head control that is given to the image data of the respective colors and transferred in order to form (hit) ink dots discharged from the respective color nozzles in a position of an identical pixel on a print medium as described above. It is necessary to give and transfer such null data before starting printing (before transferring image data) and after ending printing (after transferring image data) in each scan in accordance with movement of the print head HD in the main scanning direction as described later.

Figure 2:
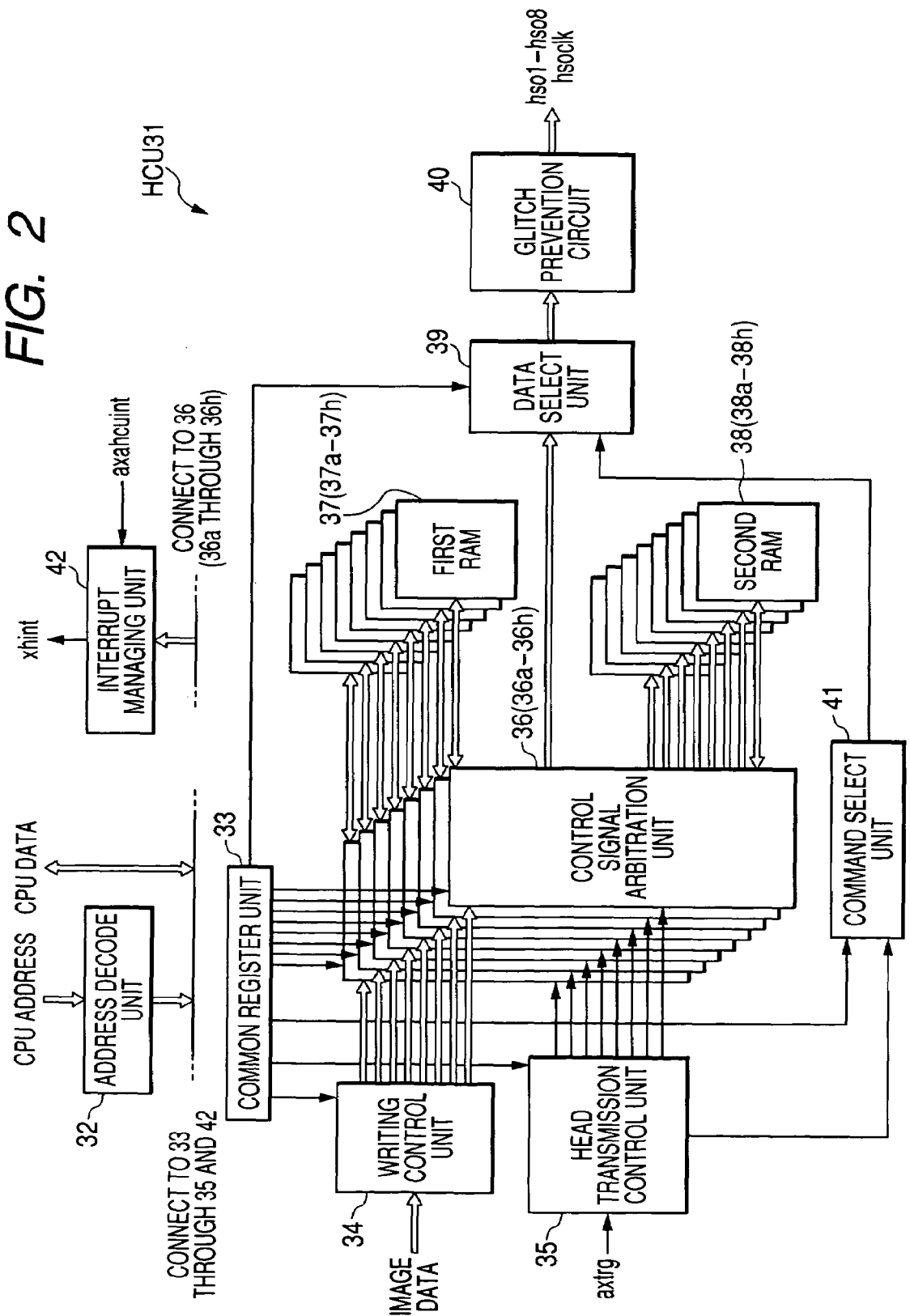
FIG. 2 is a block diagram showing a specific structure of a HCU (head control unit)

FIG. 2 is a block diagram showing the HCU 31 in this embodiment. The HCU 31 includes an address decode unit 32, a common register unit 33, a writing control unit 34, a head transmission control unit 35, a control signal arbitration unit 36 serving as a transfer control unit, a first RAM 27 (a first memory) and a second RAM 38 (a second memory) constituting the built-in memory, a data select unit 39, a glitch prevention circuit 40, a command select unit 41, and an interrupt managing unit 42. Note that the first RAM 37 and the second RAM 38 includes SRAMs (Static RAMs) in this embodiment.

The address decode unit 32 decodes an address, which is outputted from the CPU 20 when the CPU 20 accesses the common register unit 33 or respective internal registers of the writing control unit 34, the control signal arbitration unit 36, and the interrupt managing unit 42, and asserts selection signals for the respective registers.

The common register unit 33 is a common register group that is provided for performing various kinds of operation setting for the HCU 31. The common register group includes, for example, an initialization register for performing initial setting for the HCU 31 and a mode setting register for performing mode setting.

Here, the mode setting will be explained. The HCU 31 in this embodiment performs data transfer corresponding to types (the number of nozzles, nozzle arrangement, etc.) of print heads usable by the printer 1. In other words, there are various types of print heads with different numbers of nozzle rows, numbers of nozzles, and the like. For example, there are a print head having nozzle rows for the number of colors corresponding to the respective colors in a horizontal direction of the head (the main scanning direction) like the print head HD (FIG. 3) in this embodiment and, although not shown in the figure, a print head in which nozzle rows for plural colors are arranged along a vertical direction (the sub-scanning direction) of the head. A type of a print head, which the printer 1 uses to perform printing, among these various kinds of print heads is written in the mode setting register. The HCU 31 performs data transfer corresponding to the respective print heads on the basis of a setting value in this mode setting register.

The writing control unit 34 generates a readout control signal necessary for reading out image data from the second SDRAM 12 on the basis of a readout request (not shown) from the control signal arbitration unit 36 and outputs the readout control signal to the SDRAM I/F 29 (FIG. 1). The SDRAM I/F 29 reads out image data, which is stored in one face of the first RAM 37 or the second RAM 38, from the second SDRAM 12 in response to this readout control signal. Then, the writing control unit 34 receives the data read out from the second SDRAM 12 through the SDRAM I/F 29 and transfers the data to the control signal arbitration unit 36.

The writing control unit 34 generates a writing control signal necessary for writing the image data, which are read out from the second SDRAM 12 in this way, in the first RAM 37 and the second RAM 38 with the control signal arbitration unit 36. Note that the image data are written in the first RAM 37 and the second RAM 38 alternately in an order of scan by the print head in accordance with movement in the main scanning direction of the print head.

The head transmission control unit 35 generates a readout control signal for reading out the image data, which are sequentially transferred to the first RAM 37 and the second RAM 38, by an amount equivalent to the number of nozzles in accordance with movement in the main scanning direction of the print head with the control signal arbitration unit 36. This readout control signal is generated on the basis of a trigger signal axtrg that is generated by a not-shown trigger generating unit in synchronization with the drive signal (the trapezoidal wave). Note that the head transmission control unit 35 also performs, for example, generation of a clock signal HSOCLK necessary for the print head HD to capture the drive signal (the trapezoidal wave) on the basis of the image data.

The control signal arbitration unit 36 arbitrates the writing control signal received from the writing control unit 34 and the readout control signal received from the head transmission control unit 35 in accordance with a selection state of the RAM and accesses (writes data in or reads data out from) the first RAM 37 and the second RAM 38 on the basis of these control signals. Specifically, the control signal arbitration unit 36 includes a bit counter bitcnt (FIG. 4) and a transfer counter trcnt (FIG. 5). The control signal arbitration unit 36 judges which of the first RAM 37 and the second RAM 38 is an object of data writing or readout on the basis of a counter value of the bit counter bitcnt. The bit counter bitcnt and the transfer counter trcnt will be described later.

As described above, the control signal arbitration unit 36 writes the image data in the first RAM 37 and the second RAM 38 alternately. In other words, the control signal arbitration unit 36 reads out the image data from the first RAM 37 and the second RAM 38 alternately and, when readout of the image data for one face from the RAM in the selected state ends, receives the image data for one face, which should be stored in the RAM next, via the writing control unit 34, and writes the image data in the RAM.

Note that one control signal arbitration unit 36 is allocated to two RAMS, the first RAM 37 and the second RAM 38, provided for each color. In other words, since the printer 1 is a printer for performing eight-color printing in this embodiment, eight control signal arbitration units 36a to 36h, first RAMs 37a to 37h, and second RAMs 38a to 38h are provided in the HCU 31 to cope with the eight-color printing. Note that the control signal arbitration units 36a to 36h performs the same operation for each color independently while using the first RAMs 37a to 37h and the second RAMs 38a to 38h corresponding to the respective colors. Therefore, in the following explanations, in order to avoid complication, the control signal arbitration units, the first RAMs, and the second RAMs 38 are represented as the "control signal arbitration unit 36", the "first RAM 37", and the "second RAM 38" without distinguishing these colors unless specifically noted otherwise. In this case, it is assumed that the control signal arbitration unit 36, the first RAM 37, and the second RAM 38 have the same constitutions and actions for the respective colors.

The command select unit 41 selects and outputs command data for head control corresponding to a type of the print head on the basis of a control signal from the head transmission control unit 35. Specifically, command data corresponding to a special head (nozzle rows for plural colors are arranged vertically in one nozzle row described above) is stored in the command select unit 41. Command data and the like corresponding to the print head HD (FIG. 3) as in this embodiment are stored in the first RAM 37 and the second RAM 38 together with the image data.

The data select unit 39 selects, in accordance with a type of a selected print head, whether command data transmitted to the print head is command data read out from the first RAM 37 and the second RAM 38 or command data outputted from the command select unit 41 and outputs the command data to the glitch prevention circuit 40. Note that the command data are given to the image data read out by the control signal arbitration unit 36 and outputted to the glitch prevention circuit 40. Here, when the null data are outputted from the control signal arbitration unit 36 (details will be described later), the data select unit 39 gives the command data to the null data and output the command data to the glitch prevention circuit 40.

The glitch prevention circuit 40 includes, for example, a flip-top circuit (not shown) and eliminates noise (glitch) due to combination delay that occurs in data outputted through the data select unit 39. The data outputted via the glitch prevention circuit 40 are supplied to the print head HD as print data hso1 to hso8 (specifically, data obtained by adding the command data to the null data or the image data) corresponding to the respective colors together with the clock signal HSOCLK.

Note that the interrupt managing unit 42 manages interrupt processing that the HCU 31 executes on the CPU 20. The interrupt managing unit 42 generates an interrupt signal xhint for the CPU 20 on the basis of an interrupt signal axahcuint from the signal generating unit or the like that generates the drive signal.

Figure 4:
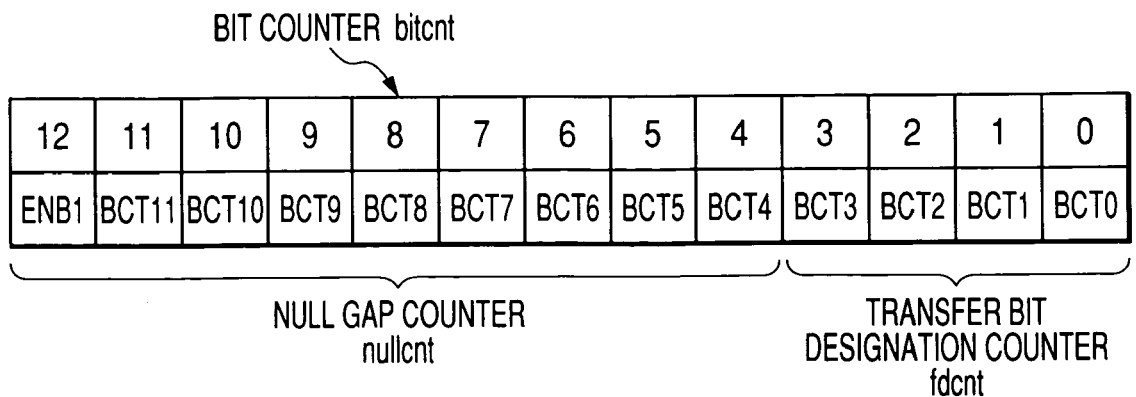
FIG. 4 is a conceptual diagram showing a bit counter.
Figure 5:
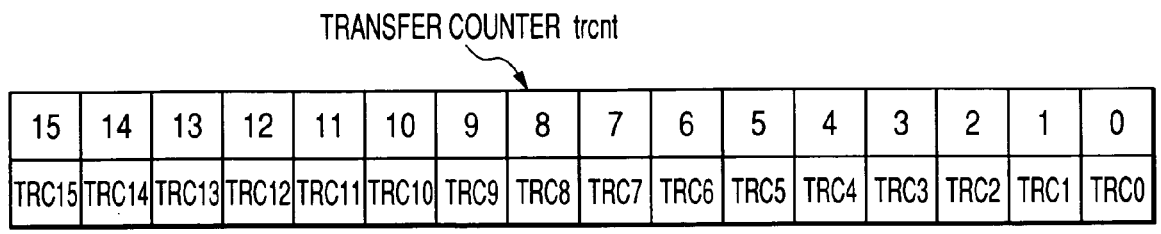
FIG. 5 is a conceptual diagram showing a transfer counter.

FIG. 4 is a conceptual diagram showing the bit counter bitcnt provided in the control signal arbitration unit 36. Note that the bit counter bitcnt is provided independently for the first RAM 37 and the second RAM 38 of the respective colors.

This bit counter bitcnt includes, for example, thirteen bits in this embodiment. Specifically, the bit counter bitcnt includes a null gap counter nullcnt including high order nine bits [12:4] among the thirteen bits and a transfer bit designation counter fdcnt including the remaining low order four bits [3:0].

In the null gap counter nullcnt, null gaps for instructing start of transfer of actual data (image data) are set on the basis of the head gaps HG1 to HG7 among the respective color nozzle rows formed in the print head HD. Note that, specifically, the null gap is a value instructing an amount of transfer of null data necessary for filling the head gaps HG1 to HG7 among the respective color nozzle rows and forming (hitting) ink dots discharged from the respective color nozzles in a position of an identical pixel on a print medium.

To describe this in detail, in print processing for one scan by the print head HD, for example, when printing for cyan is started first, in a period until the next printing for magenta is started, in order to fill the head gap HG1 between nozzle rows of cyan and magenta, the HCU 31 is required to transfer null data equivalent to null gaps corresponding to the head gap HG1 prior to start of transfer of actual data (image data) of magenta. In addition, thereafter, in a period until printing for yellow is started, in order to fill the head gap HG1+HG2 between nozzle rows of cyan and yellow, the HCU 31 is required to transfer null data equivalent to null gaps corresponding to the head gap HG1+HG2 prior to start of transfer of actual data (image data) of yellow. Subsequently, the HCU 31 is also required to transfer null data equivalent to respective color null gaps corresponding to the head gaps HG1 to HG7, respectively, prior to start of transfer of actual data of the colors.

Setting for such null gaps is performed by the CPU 20 prior to start of each scan by the printing head HD. Specifically, as this setting, in order to start print processing (start transfer of image data) on condition that a register value ENB1 of the null gap counter nullcnt is "1" when the trigger signal axtrg is inputted to the HCU 31, a value obtained by subtracting a counter value equivalent to null gaps from a counter value at this point is set in the register values ENB1, BCT4 to BCT11 of the counter nullcnt as an initial value.

Consequently, if the register value ENB1 of the null gap counter nullcnt is "0" when the trigger signal axtrg is inputted, the HCU 31 transfers the null data to the print head HD and counts up the counter nullcnt by one dot. Note that, in this embodiment, since each dot includes two bits, the HCU 31 counts up the null gap counter nullcnt for each transfer of the null data.

The HCU 31 sequentially counts up the null gap counter nullcnt for each transfer of the null data. If the register value ENB1 of the counter nullcnt is "1" when the trigger signal axtrg is inputted, the HCU 31 transfers actual data (image data) in the first RAM 37 and the second RAM 38 to the print head HD and counts up the counter nullcnt by one dot (two bits).

Note that the printer 1 in this embodiment is a printer that performs image formation (two-way printing) by discharging ink at the time of forward movement and backward movement of the print head HD, respectively. In this case, the null gaps set in the null gap counter nullcnt are changed according to scanning directions (a forward movement direction and a backward movement direction) of the print head HD.

On the other hand, every time the HCU 31 transfers the actual data (image data) in the first RAM 37 or the second RAM 38 to the print head HD, the transfer bit designation counter fdcnt counts the number of transfer bits for one face of the RAM. In other words, when the HCU 31 transfers the actual data to the print head HD, the transfer bit designation counter fdcnt instructs a transfer bit position in the first RAM 37 or the second RAM 38.

Figure 6:
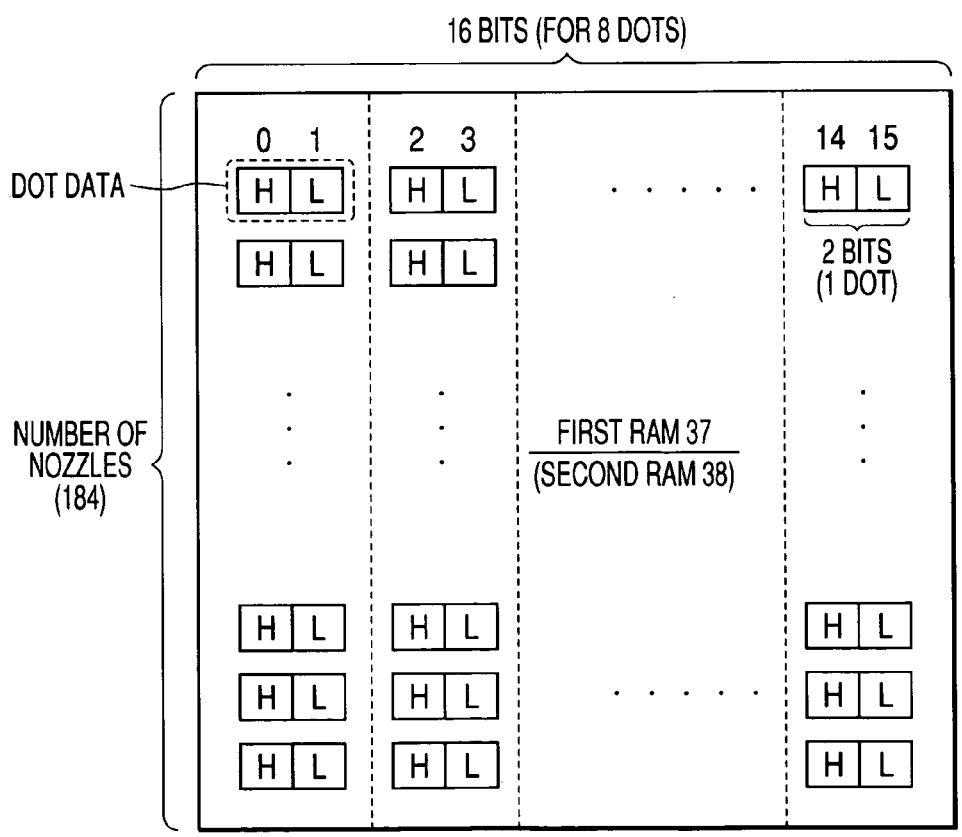
FIG. 6 is a conceptual diagram showing a built-in memory (a first RAM or a second RAM) of the HCU.

Here, in this embodiment, the first RAM 37 and the second RAM 38 include, for example, a data storage capacity of 192 words×16 bits. In these RAMs 37 and 38, as shown in FIG. 6, data for 8 dots per one line equivalent to the number of nozzles (in this embodiment, 184 nozzles) of the print head HD are stored. Note that, although not shown in FIG. 6, the command data described above are also stored in the first RAM 37 and the second RAM 38 other than such image data.

The HCU 31 sequentially reads out image data by the number of nozzles from the first RAM 37 and the second RAM 38 on the basis of input of the trigger signal axtrg (specifically, a readout control signal generated by the trigger signal axtrg) and transmits the image data to the print head HD. Specifically, after reading out data on an upper order bit side (bit data on an "H" side in FIG. 6) of two bit data forming each dot by the number of nozzles and transmitting the data, the HCU 31 also reads out data on a lower order bit side (bit data on an "L" side in FIG. 6) by the number of nozzles and transmits the data. Then, finally, the HCU 31 adds command data to the image data and transmits the command data. The HCU 31 transfers the image data sequentially read out from the first RAM 37 or the second RAM 38 by the number of nozzles to the print head HD eight times (image data for 8 dots per one line) to thereby end the data transfer for one face of the RAM.

The transfer bit designation counter fdcnt uses lower order four bits [3:0] of the bit counter bitcnt in order to cope with such data transfer by the HCU 31. In other words, the HCU 31 counts up the transfer bit designation counter fdcnt by one dot (specifically, by 2) every time the image data in the RAMs are transferred by the number of nozzles on the basis of input of the trigger signal axtrg. Therefore, in transferring the image data to the print head HD, the HCU 31 can learn transfer bit positions for the image data (0, 2, 4, 6, 8, 10, 12, 14) by referring to register values BCT0 to BCT3 of the transfer bit designation counter fdcnt. Then, when a value of the transfer bit designation counter fdcnt reaches 16, the HCU 31 judges that the data transfer for one face of the RAM ends and switches a RAM, from which data is read out, between the first RAM 37 and the second RAM 38.

FIG. 5 is a conceptual diagram showing the transfer counter trcnt provided in the control signal arbitration unit 36. Note that the transfer counter trcnt is provided independently for each color.

In this embodiment, the transfer counter trcnt includes, for example, 16 bits. In print processing for one scan by the print head HD, a value, which indicates, with one face of the RAM as a count unit, image data stored in the first RAM 37 or the second RAM 38 equivalent to how many faces should be transferred, is set as an initial value in the counter trcnt. This setting is performed by the CPU 20 prior to start of each scan by the print head HD.

The HCU 31 reads out image data for one surface of the RAM from the first RAM 37 and the second RAM 38 alternately on the basis of a counter value of the transfer counter trcnt and sequentially transfers the image data to the print head HD. The HCU 31 decrements a counter value of the transfer counter trcnt by 1 every time the first RAM 37 and the second RAM 38 are switched. Then, when the counter value of the transfer counter trcnt reaches 0 (specifically, respective register values TRC0 to TRC15 are 0), the HCU 31 judges that transfer of the image data for one scan ends.

When the counter value of the transfer counter trcnt reaches 0 and transfer of image data for one scan ends in this way, thereafter, the HCU 31 transfers null data on condition that the trigger signal axtrg is inputted.

To describe this in detail, in the print processing for one scan by the print head DH, for example, when printing ends for cyan first, in order to fill the head gaps HG1 to HG7 among the nozzle rows in a period until final printing for clear ends, it is necessary to transfer null data equivalent to null gaps corresponding to the head gaps HG1 to HG7. In other words, after the printing for cyan ends (transfer for actual data ends), it is necessary to transfer null data until printing for all the other colors ends in order to prevent discharge of ink droplets in an extra-print area. Note that, in the print processing for one scan by the print head HD, the trigger signal axtrg is inputted to the HCU 31 until the printing for all the colors ends. Consequently, concerning a color for which a value of the transfer counter trcnt reaches 0, thereafter, the HCU 31 transfers null data until input of the trigger signal axtrg to the HCU 31 is stopped.

Next, an action of the HCU 31 constituted as described above will be explained.

Figure 7A:
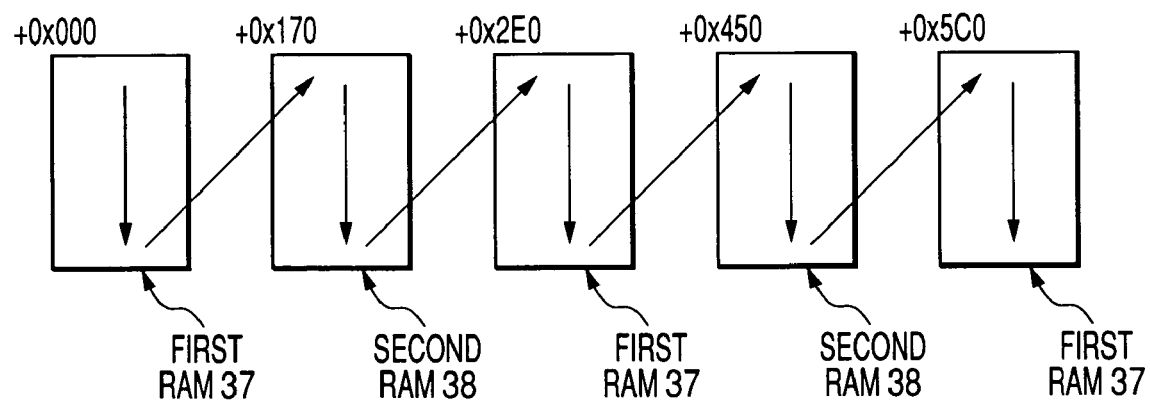
FIGS. 7A and 7B are conceptual diagrams showing data transfer to the built-in memory.
Figure 7B:
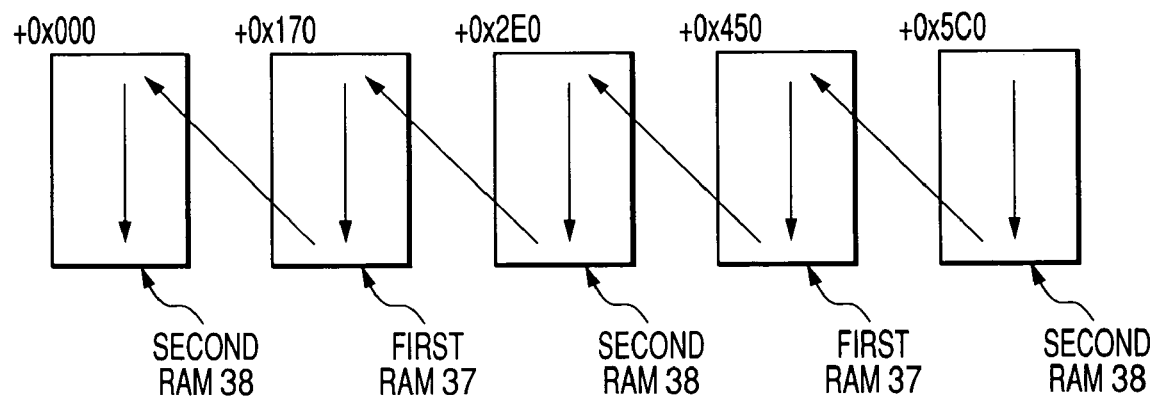

FIGS. 7A and 7B are conceptual diagrams showing processing for data transfer from the second SDRAM 12 to the first RAM 37 and the second RAM 38. Note that, for simplification of explanation, here, a size of image data for one scan is set to, for example, 80 bits (equivalent to 40 dots). In this case, a counter value "5" (=80/16), which corresponds to the number of transfers of image data for one scan by the print head HD with image data for one face of the RAM as a count unit, is set in the transfer counter trcnt in advance prior to start of scan. This counter value is sequentially decremented by one every time transfer of image data for one face of the RAM to the print head HD ends as described above.

As shown in FIG. 7A, when the print head HD moves forward, first, the HCU 31 designates an address +0x000 of the second SDRAM 12 and transfers image data (equivalent to 184×16 bits, the same applies in the following explanation) for one face of the RAM following this leading address from the second SDRAM 12 to the first RAM 37. Subsequently, the HCU 31 designates an address +0x170 of the second SDRAM 12 and transfers image data for one face of the RAM following this leading address from the second SDRAM 12 to the second RAM 38. In the same manner, the HCU 31 sequentially designates leading addresses +0x2E0, +0x450, and +0x5c0 of data transferred to the RAM to thereby transfer data to the first RAM 37 and the second RAM 38 alternately (in this embodiment, data equivalent to five faces of the RAM).

On the other hand, when the print head HD moves backward, as shown in FIG. 7B, first, the HCU 31 designates an address +0x5c0 of the second SDRAM 12 and transfers image data for one face of the RAM following this leading address from the second SDRAM 12 to the second RAM 38. Tracking addresses opposite to those at the time of the forward movement, the HCU 31 sequentially designates leading addresses +0x450, +0x2E0, +0x170, and 0+000 of data transferred to the RAM to thereby transfer the data to the first RAM 37 and the second RAM 38 alternately (in this embodiment, data equivalent to five faces of the RAM).

Figure 8A:
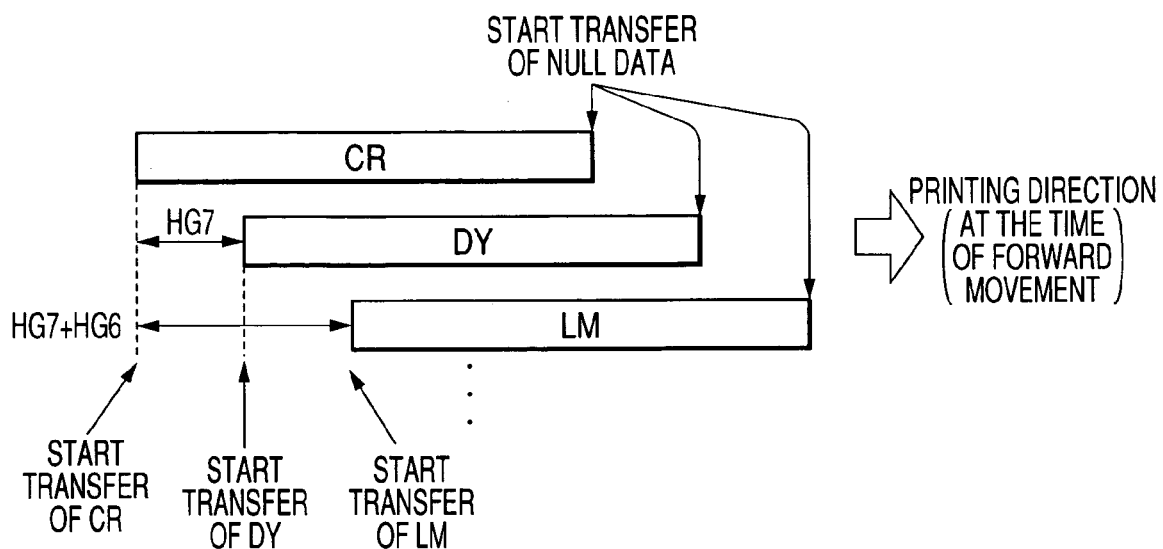
FIGS. 8A and 8B are timing charts showing data transfer to the print head.
Figure 8B:
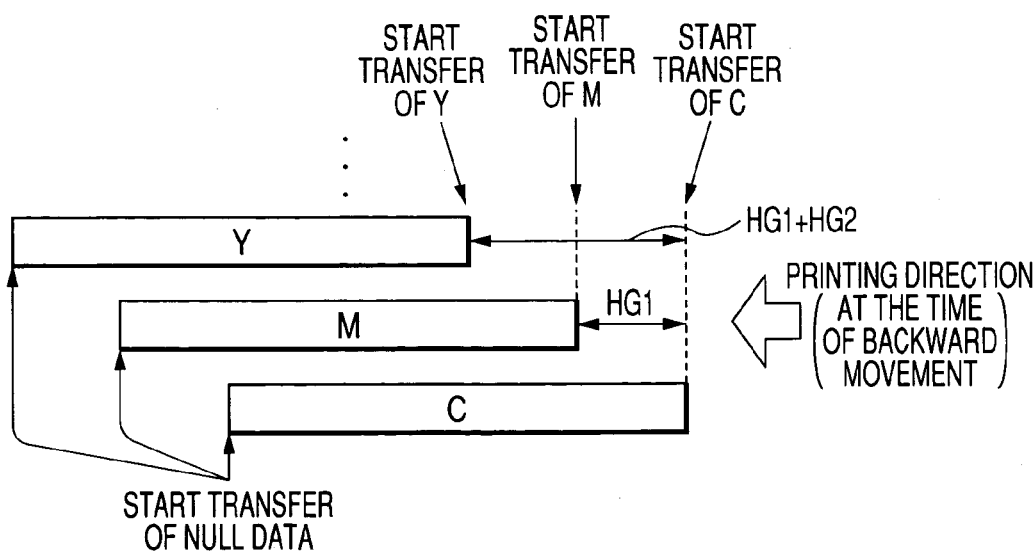

FIGS. 8A and 8B are timing charts showing processing for data transfer to the print head HD at the time of forward movement and backward movement of the print head HD. Note that FIGS. 8A and 8B show the processings for a part of the colors.

As shown in FIG. 8A, at the time of forward movement of the print head HD, in accordance with a nozzle arrangement of the head HD (FIG. 3), the HCU 31 performs actual data (image data) in an order of, for example, clear, dark yellow, light magenta, . . . , and cyan.

Here, since the head gap HG7 is formed between a nozzle row of clear and a nozzle row of dark yellow, a null gap corresponding to this head gap HG7 is set in the null gap counter nullcnt provided for dark yellow. Therefore, after starting transfer of the actual data for clear, the HCU 31 transfers null data equivalent to the null gap corresponding to the head gap HG7 and, then, starts transfer of the actual data for dark yellow.

In addition, since the head gap HG7+HG6 are formed between the nozzle row of clear and a nozzle row of light magenta, a null gap corresponding to the head gap HG7+HG6 is set in the null gap counter nullcnt provided for light magenta. Therefore, after starting transfer of the actual data for clear, the HCU 31 transfers null data equivalent to the null gap corresponding to the head gap HG7+HG6 and, then, starts transfer of the actual data for light magenta.

Similarly, for light cyan, black, yellow, magenta, and cyan, the HCU 31 transfers null data for a predetermined number of dots in accordance with null gaps set in the respective null gap counters nullcnt in advance and, then, starts transfer of the actual data.

Thereafter, the HCU 31 transfers actual data for one scan of the respective colors on the basis of the transfer bit designation counter fdcnt and the transfer counter trcnt provided for the respective colors. When the transfer of the actual data ends, the HCU 31 starts transfer of null data following the transfer of the actual data.

Specifically, in this embodiment, transfer processing for the actual data ends in an order of clear, dark yellow, light magenta, . . . , and cyan. In this case, until the transfer processing for actual data for cyan ends, after end of transfer of the actual data for clear, dark yellow, light magenta, . . . , and magenta, the HCU 31 transfers null data following the transfer of the actual data.

On the other hand, as shown in FIG. 8B, at the time of backward movement of the print head HD, in accordance with a nozzle arrangement of the head HD (FIG. 3), the HCU 31 transfers the actual data (the image data) in an order opposite to that at the time of forward movement, that is, in an order of cyan, magenta, yellow, . . . and clear.

Here, since the head gap HG1 is formed between a nozzle row of cyan and a nozzle row of magenta, a null gap corresponding to the head gap HG1 is set in the null gap counter nullcnt provided for cyan. Therefore, after starting transfer of the actual data for cyan, the HCU 31 transfers null data equivalent to the null gap corresponding to the head gap HG1 and, then, starts transfer of the actual data for magenta.

In addition, since the head gap HG1+HG2 is formed between the nozzle row of cyan and a nozzle-row of yellow, a null gap corresponding to the head gap HG1+HG2 is set in the null gap counter nullcnt provided for yellow. Therefore, after starting transfer of the actual data for cyan, the HCU 31 transfers null data equivalent to the null gap corresponding to the head gap HG1+HG2 and, then, starts transfer of the actual data for yellow.

Similarly, for black, light cyan, light magenta, dark yellow, and clear, the HCU 31 transfers null data for a predetermined number of dots in accordance with null gaps set in the respective null gap counters nullcnt in advance and, then, starts transfer of the actual data.

Thereafter, the HCU 31 transfers actual data for one scan of the respective colors on the basis of the transfer bit designation counter fdcnt and the transfer counter trcnt provided for the respective colors. When the transfer of the actual data ends, the HCU 31 starts transfer of null data following the transfer of the actual data.

Specifically, in this embodiment, transfer processing for the actual data ends in an order of cyan, magenta, yellow, . . . , and clear. In this case, until the transfer processing for actual data for clear ends, after end of transfer of the actual data for cyan, magenta, yellow, . . . and dark yellow, the HCU 31 transfers null data following the transfer of the actual data.

FIG. 9 is a flowchart showing a flow of processing in performing data transfer from the first RAM 37 and the second RAM 38 to the print head HD. Note that transfer processing for one color will be explained here.

When print processing for one scan is started, first, the HCU 31 judges whether the trigger signal axtrg is inputted (step 100). When it is judged here that the trigger signal axtrg is inputted, the HCU 31 judges whether a counter value of the bit counter bitcnt reaches a predetermined value (step 110). Specifically, the HCU 31 judges whether a counter value of the null gap counter nullcnt reaches a predetermined counter value instructing start of transfer of the actual data (in this embodiment, whether the register value EnB1 is "1").

Here, when it is judged that a counter value of the null gap counter nullcnt does not reach the counter value instructing start of transfer of the actual data (step 110; NO), the HCU 31 transfers null data for the number of nozzles (step 120). Then, the HCU 31 counts up a counter value of the bit counter bitcnt, specifically, a counter value of the null gap counter nullcnt by 1 dot following the transfer of the null data (step 130). Thereafter, the HCU 31 returns to step 100 and waits for input of the next trigger signal axtrg.

On the other hand, when it is judged that a counter value of the null gap counter nullcnt reaches the counter value instructing start of transfer of the actual data (step 110; YES), the HCU 31 transfers the actual data for the number of nozzles (step 140). Then, the HCU 31 counts up a counter value of the bit counter bitcnt, specifically, a counter value of the transfer bit designation counter fdcnt by 1 dot following the transfer of the null data (step 150).

Next, concerning the first RAM 37 or the second RAM 38 from which data is currently read out, the HCU 31 judges whether transfer of the actual data for one face of the RAM ends (step 160). Specifically, the HCU 31 judges whether a value of the transfer bit designation counter fdcnt reaches a counter value instructing end of transfer of the actual data (in this embodiment, whether the counter value is "16").

Here, when it is judged that a counter value of the transfer bit designation counter fdcnt does not reach the counter value instructing end of transfer of the actual data (step 160; NO), the HCU 31 waits for input of the next trigger signal axtrg (step 170). Then, thereafter, when it is judged that the trigger signal axtrg is inputted, the HCU 31 returns to step 140, transfers the actual data for the number of nozzles in a transfer bit position instructed by the transfer bit designation counter fdcnt, and counts up the counter value of the counter fdcnt by 1 dot following the transfer of the actual data. The HCU 31 transfers the actual data for one face of the RAM (in this embodiment, for 184×16 bits) while referring to the counter value of the transfer bit designation counter fdcnt in this way.

Then, when it is judged that a counter value of the transfer bit designation counter fdcnt reaches the counter value instructing end of transfer of the actual data (step 160; YES), that is, when it is judged that the transfer of the actual data for one face of the RAM ends, the HCU 31 decrements the counter value of the transfer counter trcnt (step 180).

Next, the HCU 31 judges whether a counter value of the transfer counter trcnt is "0" (step 190).

Here, when it is judged that a counter value of the transfer counter trcnt is not "0" (step 1909; NO), that is, when it is judged that the transfer of the actual data for one scan does not end, the HCU 31 waits for input of the next trigger signal axtrg (step 200). Thereafter, when it is judged that the trigger signal axtrg is inputted, the HCU 31 returns to step 140 and transfers the actual data for one face of the RAM, which is the next readout object switched between the first RAM 37 and the second RAM 38, in the same manner as described above.

Then, when it is judged that a counter value of the transfer counter trcnt is "0" (step 190; YES), that is, when it is judged that the transfer of the actual data for one scan ends, thereafter, the HCU 31 transfers null data on condition that the trigger signal axtrg is inputted (step 210). Consequently, the HCU 31 ends the data transfer processing for one scan.

As described above, according to this embodiment, advantages described below are realized.

(1) The null gap counter nullcnt, which instructs start of transfer of image data for each scan by the print head HD, and the transfer counter trcnt, which instructs end of transfer of image data for each scan of the print head HD, are provided in the HCU 31 for each color. Consequently, in each scan by the print head HD, the HCU 31 transfers null data until the null gap counter nullcnt reaches a counter value instructing start of transfer. In addition, after starting transfer of the image data in accordance with the null gap counter nullcnt, the HCU 31 transfers the image data until the transfer counter trcnt reaches a counter value instructing end of transfer. Then, after the transfer counter trcnt reaches the counter value instructing end of transfer, the HCU 31 transfers the null data until printing for the respective colors ends. Therefore, according to this embodiment, the HCU 31 can transfer image data for one scan without the intervention of control by the CPU 20. In addition, in transferring the image data, the HCU 31 can automatically generate null data for each color in the HCU 31 and transfer the null data.

(2) Null gaps corresponding to the head gaps HG1 to HG7 are set in the null gap counter nullcnt. Consequently, the HCU 31 can transfer null data before start of transfer of image data on the basis of a counter value of the null gap counter nullcnt.

(3) It is possible to set arbitrary null gaps in the null gap counter nullcnt. Consequently, in this embodiment, it is possible to perform print processing corresponding to a print head with the arbitrary head gaps.

(4) Null gaps corresponding to scanning directions (a direction at the time of forward movement and a direction at the time of backward direction) of the print head HD are set in the null gap counter nullcnt. Consequently, the HCU 31 can transfer null data suitably at the time of both the forward movement and the backward movement of the print head HD.

(5) The transfer bit designation counter fdcnt, which counts the number of transfer bits of image data to the print head HD for one face of the RAM, is provided for each color. Consequently, the HCU 31 can learn a transfer bit position of image data transferred to the print head HD if the HCU 31 refers to a counter value of the transfer bit designation counter fdcnt.

(6) The transfer counter trcnt, which indicates image data for one face of the RAM equivalent to how many faces should be transferred in transferring image data for one scan by the print head HD, is provided in the HCU 31 for each color. Consequently, the HCU 31 can transfer null data after end of transfer of the image data on the basis of a counter value of the transfer counter trcnt.

(7) In this embodiment, two memories, the first RAM 37 and the second RAM 38, are provided for each color. With this constitution, it is possible to perform data transfer efficiently.

Note that, in the embodiment described above, modifications changed as described below may be adopted.

(First modification) In the embodiment, the null gap counter nullcnt and the transfer bit designation counter fdcnt are provided separately in the bit counter bitcnt. However, these counters nullcnt and fdcnt may be realized by one counter.

(Second modification) In the embodiment, two RAMs, the first RAM 37 and the second RAM 38, are provided for each color. However, it is not always necessary to provide two RAMs.

(Third modification) In the embodiment, each dot includes two bits. However, the dot is not always limited to two bits.

(Fourth modification) In the embodiment, the printer 1 performs two-way printing. However, it is needless to mention that the printer 1 may perform one-way printing.

(Fifth modification) In the embodiment, the printer 1 performs printing in eight colors, C, M, Y, K, LC, LM, DY, and CR. However, it is needless to mention that printing is not always limited to the eight colors.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japan Patent Application No. 2004-125870 filed on Apr. 21, 2005, the contents of which are incorporated herein for reference.

What is claimed is:

1. A method of transferring image data, comprising:

transferring image data stored in an image buffer to a memory;

transferring image data for each color stored in the memory to a liquid ejecting head for ejecting a liquid droplet from the liquid ejecting head;

transferring first null data to the liquid ejecting head before start of the transfer of the image data from the memory to the liquid ejecting head;

transferring second null data to the liquid ejecting head after end of transfer of the image data from the memory to the liquid ejecting head;

counting the number of transfer bits of the image data transferred from the memory to the liquid ejecting head for one face of the memory; and transferring the second null data to the liquid ejecting head based on both of a count value indicating null gaps of respective colors corresponding to head gaps in each scanning operation of the liquid electing head and a result of the counting process.

2. The method as set forth in claim 1, wherein the first null data is transferred to the liquid ejecting head on the basis of head gaps defined among respective color nozzle rows of the liquid ejecting head.

3. The method as set forth in claim 2, wherein the liquid ejecting head reciprocatingly moves at a forward ejecting operation and a rearward ejecting operation in a scanning direction while ejecting the liquid droplet therefrom; and wherein the first null data is transferred to the liquid ejecting head on the basis of the head gaps corresponding to moving directions of the liquid ejecting head at the forward ejecting operation and the rearward ejecting operation.

4. The method as set forth in claim 1, wherein the memory includes a first memory and a second memory for each color;

wherein the image data is transferred from the image buffer to the first memory and the second memory alternately; and wherein the image data read from the first and the second memories alternately are transferred to the liquid ejecting head.

5. The method as set forth in claim 1, wherein the image data to be transmitted to the liquid ejecting head is read from the memory sequentially by an amount corresponding to a nozzle number of the liquid ejecting head when the image data for each color is transferred to a liquid ejecting head.

6. A method of transferring image data comprising:

transferring image data stored in an image buffer to a memory;

transferring image data for each color stored in the memory to a liquid ejecting head for ejecting a liquid droplet from the liquid ejecting head;

transferring first null data to the liquid ejecting head before start of the transfer of the image data from the memory to the liquid ejecting head;

transferring second null data to the liquid ejecting head after end of transfer of the image data from the memory to the liquid ejecting head;

counting the number of the image data transferred from the memory to the liquid ejecting head by one face of the memory; and transferring the second null data to the liquid ejecting head based on both of a number of the transferred image data for one scanning operation of the liquid ejecting head previously set in each scanning operation of the liquid ejecting head and a result of the counting process.

7. A liquid ejecting apparatus, comprising:

an image buffer which stores image data;

a memory;

a liquid ejecting head which ejects a liquid droplet based on the image data; and a head control unit which transfers the image data stored in the image buffer to the memory, and transfers the image data for each color stored in the memory to the liquid ejecting head, wherein the head control unit transfers first null data to the liquid ejecting head before start of the transfer of the image data from the memory to the liquid ejecting head;

wherein the head control unit transfers second null data to the liquid ejecting head after end of transfer of the image data from the memory to the liquid ejecting head;

wherein the head control unit counts the number of transfer bits of the image data transferred from the memory to the liquid ejecting head for one face of the memory; and wherein the head control unit transfers the second null data to the liquid ejecting head based on both of a count value indicating null gaps of respective colors corresponding to head gaps in each scanning operation of the liquid ejecting head and a result of the counting process.

* * * * *